(12) United States Patent
Oehring et al.

(10) Patent No.: US 12,209,489 B2
(45) Date of Patent: Jan. 28, 2025

(54) INSTRUMENTED FRACTURING SLURRY FLOW SYSTEM AND METHOD

(71) Applicant: U.S. Well Services, LLC, Houston, TX (US)

(72) Inventors: Jared Oehring, Houston, TX (US); Alexander James Christinzio, Morgantown, WV (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 18/209,256

(22) Filed: Jun. 13, 2023

(65) Prior Publication Data
US 2023/0408375 A1 Dec. 21, 2023

Related U.S. Application Data

(63) Continuation of application No. 17/379,341, filed on Jul. 19, 2021, now Pat. No. 11,674,868, which is a continuation of application No. 16/152,695, filed on Oct. 5, 2018, now Pat. No. 11,067,481.

(60) Provisional application No. 62/568,716, filed on Oct. 5, 2017.

(51) Int. Cl.
*E21B 43/26* (2006.01)
*G01M 99/00* (2011.01)

(52) U.S. Cl.
CPC .......... *E21B 43/2607* (2020.05); *E21B 43/26* (2013.01); *G01M 99/005* (2013.01)

(58) Field of Classification Search
CPC ... E21B 43/26; E21B 43/2607; G01M 99/005
See application file for complete search history.

(56) References Cited

U.S. PATENT DOCUMENTS

| | | | |
|---|---|---|---|
| 2014/0048255 A1* | 2/2014 | Baca | E21B 33/068 166/250.1 |
| 2014/0379300 A1* | 12/2014 | Devine | F04B 51/00 702/182 |
| 2016/0032703 A1* | 2/2016 | Broussard | E21B 43/2607 166/250.01 |
| 2017/0226842 A1* | 8/2017 | Omont | E21B 43/26 |
| 2017/0314979 A1* | 11/2017 | Ye | E21B 47/107 |

* cited by examiner

*Primary Examiner* — Brad Harcourt
(74) *Attorney, Agent, or Firm* — Hogan Lovells US LLP

(57) ABSTRACT

Embodiments include a method for monitoring a fracturing operation that includes positioning a pump at a well site where fracturing operations are being conducted. The method also includes arranging one or more sensors at at least one of a pump inlet or a pump outlet, the one or more sensors monitoring a flow rate of a slurry. The method includes receiving flow data from the one or more sensors. The method also includes determining a pump efficiency, based at least in part on the flow data, is below a threshold. The method further includes adjusting one or more operating parameters of the pump.

12 Claims, 9 Drawing Sheets

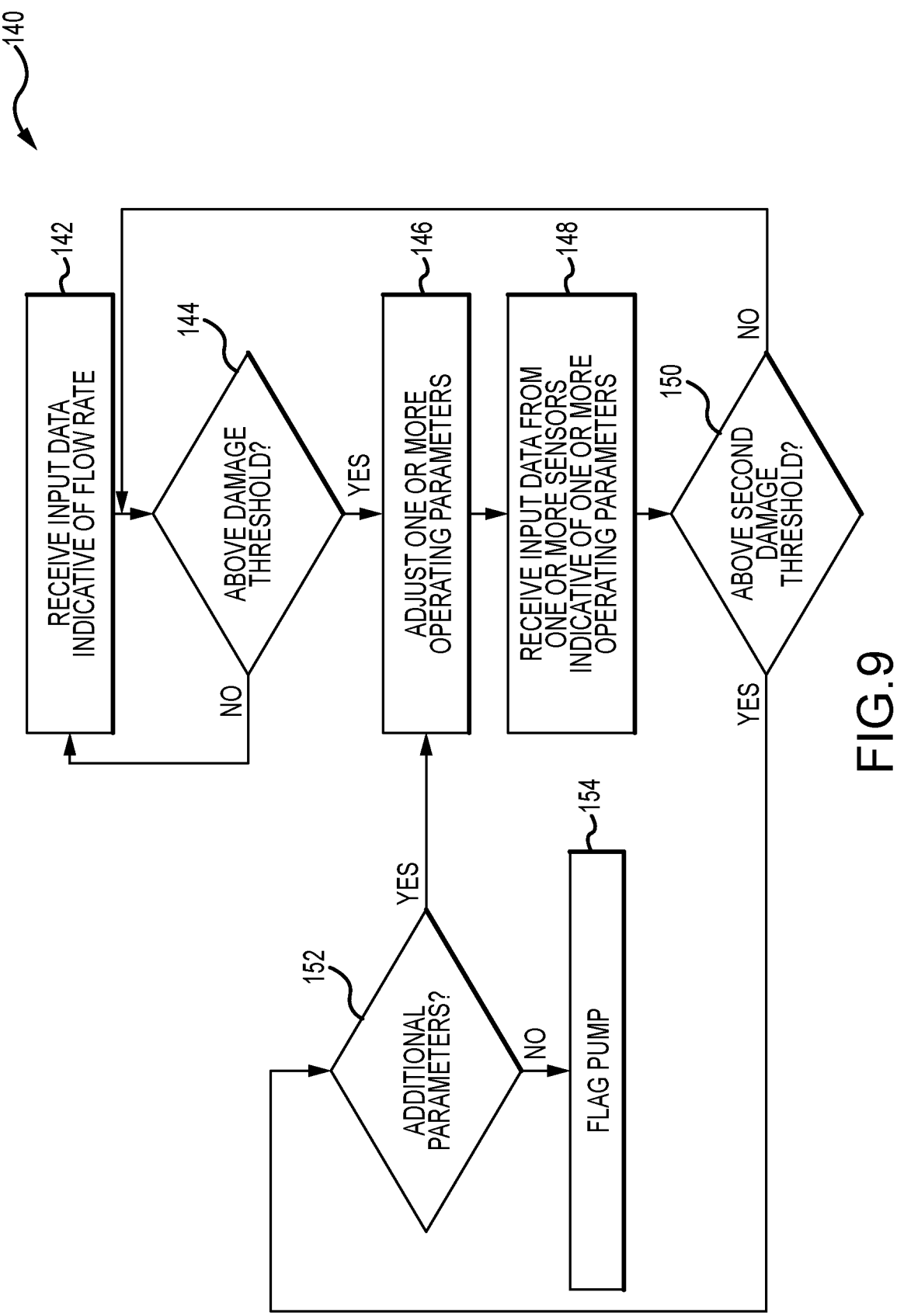

INSTRUMENTED FRACTURING SLURRY FLOW SYSTEM AND METHOD

CROSS REFERENCE TO RELATED APPLICATIONS

This application is a continuation of U.S. patent application Ser. No. 17/379,341 filed Jul. 19, 2021 titled "INSTRUMENTED FRACTURING SLURRY FLOW SYSTEM AND METHOD," now U.S. Pat. No. 11,674,868 issued Jun. 13, 2023, which is a continuation of U.S. patent application Ser. No. 16/152,695 filed Oct. 5, 2018 titled "INSTRUMENTED FRACTURING SLURRY FLOW SYSTEM AND METHOD," now U.S. Pat. No. 11,067,481 issued Jul. 20, 2021, which claims priority to and the benefit of U.S. Provisional Patent Application No. 62/568,716 filed Oct. 5, 2017 titled "INSTRUMENTED FRACTURING SLURRY FLOW SYSTEM AND METHOD," the full disclosure of which are hereby incorporated herein by reference in their entirety for all intents and purposes.

BACKGROUND

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Typically, measuring flow rates throughout the fracturing system, such as at the suction or discharge of pump, is challenging because fracturing pumps move slurry mixtures that are formed from solids, liquids, gases, or a combination thereof. As a result, positioning a probe or flow measuring device encounters difficulties due to the abrasive nature of the slurry as well as the inconsistency of the slurry as it flows into and out of the pumps. Accordingly, operators attempt to calculate the flow rates throughout the system. Because flow rates are not known, it is difficult to monitor the performance of various equipment in the fracturing operation, such as the pumps. Furthermore, monitoring potential wear and tear on the equipment is also challenging. These challenges are present for equipment that is powered traditionally by diesel engines or powered electrically.

SUMMARY

Applicant recognized the problems noted above herein and conceived and developed embodiments of systems and methods, according to the present disclosure, for assessing flow rates in hydraulic fracturing systems.

In an embodiment, a method for monitoring a fracturing operation includes positioning a pump at a well site where fracturing operations are being conducted. The method also includes arranging one or more sensors at least one of a pump inlet or a pump outlet, the one or more sensors monitoring a flow rate of a slurry. The method includes receiving flow data from the one or more sensors. The method also includes determining a pump efficiency, based at least in part on the flow data, is below a threshold. The method further includes adjusting one or more operating parameters of the pump.

In an embodiment, a system for monitoring a hydraulic fracturing operation includes a pump arranged a well site where hydraulic fracturing is to be performed, the pump being fluidly coupled to a slurry supply at a suction end and to discharge piping at a discharge end. The system also includes a first sensor arranged at at least one of the suction end or the discharge end, the first sensor determining a flow rate of the slurry. The system further includes a second sensor arranged proximate the pump to measure one or more operating parameters of the pump. The system also includes a controller communicatively coupled to the pump, the first sensor, and the second sensor, wherein the controller adjusts the one or more operating parameters based at least in part on information received from the first sensor.

In an embodiment, a method for adjusting a pump during a fracturing operation includes receiving first data from a first sensor arranged at a suction side of the pump. The method also includes receiving second data from a second sensor arranged a discharge side of the pump. The method further includes determining a pump efficiency, based at least in part on the first data and the second data. The method also includes comparing the pump efficiency to a threshold, the threshold being a pre-determined value indicative of an operational condition of the pump. The method further includes determining the pump efficiency is below the threshold. The method includes performing an action associated with the pump.

In an embodiment, a pump is diesel powered.

In an embodiment, a pump is electric powered.

In an embodiment, one or more additional sensors monitor pressure.

In an embodiment, one or more additional sensors monitor vibrations.

In an embodiment, one or more additional sensors monitor density.

In an embodiment, the sensors transmit data wireless.

In an embodiment, the sensors transmit data through a wired connection.

BRIEF DESCRIPTION OF DRAWINGS

The foregoing aspects, features, and advantage of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 9 is a flow chart of an embodiment of a method for monitoring a pump in a fracturing operation, in accordance with embodiments of the present disclosure.

DETAILED DESCRIPTION

Figure 1:
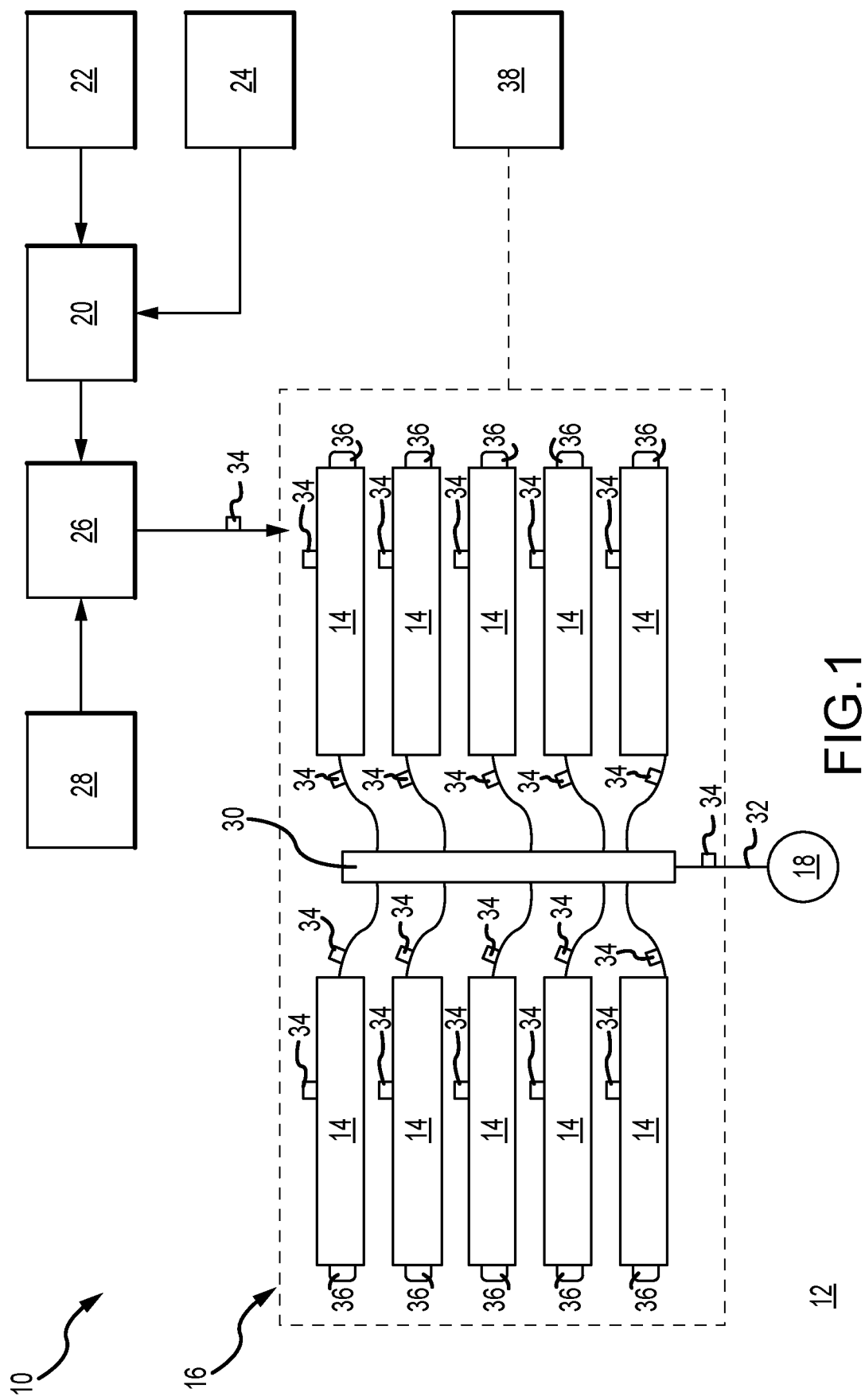
FIG. 1 is a schematic plan view of an embodiment of a fracturing operation, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe one or more flow sensors arranged on a suction side and/or a discharge side of a pump or group of pumps. The one or more flow sensors monitor the flow rate of a slurry fluid through one or more tubulars without directly contacting the slurry flow, in various embodiments. That is, the one or more sensors monitors the flow of the slurry though the tubular wall. As such, the reliability and longevity of the one or more flow sensors is improved because the flow sensors may not be degraded or otherwise impacted via contact with the slurry. However, in other embodiments, the flow sensors may at least partially be in fluid communication with the slurry. It should be appreciated that the one or more sensors may be located at position in the system that is upstream and/or downstream of an individual pump or a group of pumps, respectively. For example, the one or more sensors may be located at a pump inlet, a pump outlet, a common pump inlet manifold, a common pump outlet, a combination thereof, or any other reasonable location. The data acquired by the flow sensors may be utilized to adjust the operation of one or more pumps to thereby improve efficiencies of the pumps. For example, based on the data acquired from the one or more sensors, the pump speed or inlet pressures may be adjusted. In certain embodiments, additional sensors may also be utilized to further monitor operating parameters of the pumps, for example, vibration, RPM, pressure, temperature, or the like to monitor for potential operating inefficiencies, such as cavitation. This data may be aggregated, for example on a network server, and utilized to control operations at a well site.

FIG. 1 is a plan schematic view of an embodiment of a hydraulic fracturing system 10 positioned at a well site 12. In the illustrated embodiment, pump trucks 14, which make up a pumping system 16, are used to pressurize a slurry solution for injection into a wellhead 18. A hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump trucks 14 may receive the slurry solution at a first pressure (e.g., 80 psi to 100 psi) and boost the pressure to around 15,000 psi for injection into the wellhead 18. In certain embodiments, the pump trucks 14 are powered by electric motors.

After being discharged from the pump system 16, a distribution system 30, such as a missile, receives the slurry solution for injection into the wellhead 18. The distribution system 30 consolidates the slurry solution from each of the pump trucks 14 (for example, via common manifold for distribution of fluid to the pumps) and includes discharge piping 32 (which may be a series of discharge lines or a single discharge line) coupled to the wellhead 18. In this manner, pressurized solution for hydraulic fracturing may be injected into the wellhead 18.

In the illustrated embodiment, one or more sensors 34 are arranged throughout the hydraulic fracturing system 10. As will be described in detail below, the sensors 34 may be utilized to measure a slurry solution flow rate throughout the system 10. In various embodiments, the sensors 34 may be arranged upstream of suction locations of the pumps of the pump trucks 14 and/or downstream of the discharge location of the pumps of the pump trucks 14. However, it should be appreciated that other sensors 36, such as vibration sensors, pressure sensors, temperature sensors, or the like, may also be distributed throughout the system. In embodiments, the sensors 34 transmit flow data to a data van 38 for collection and analysis, among other things.

Figure 2:
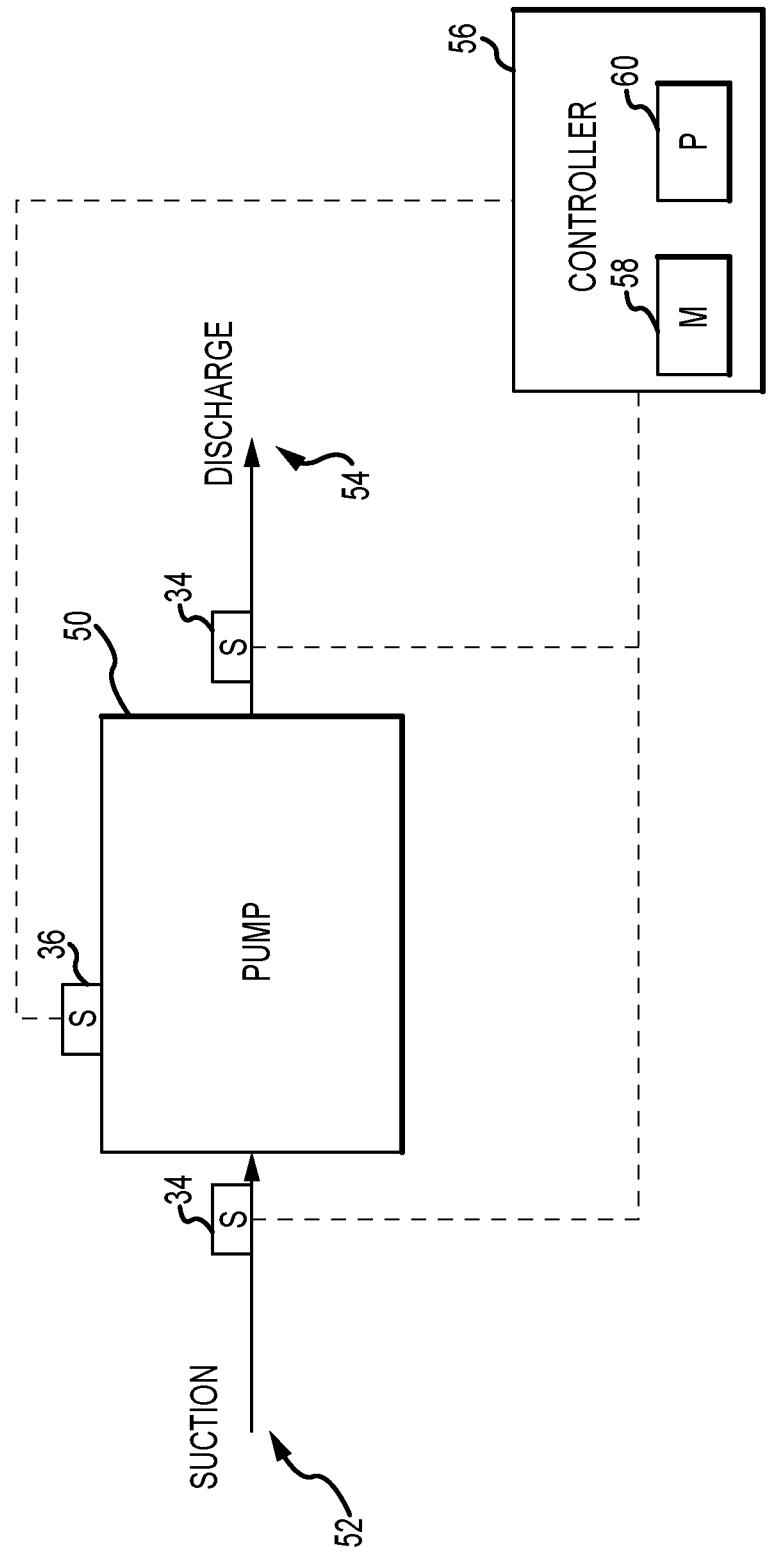
FIG. 2 is a schematic diagram of an embodiment of a pump and a controller, in accordance with embodiments of the present disclosure.

FIG. 2 is a block diagram of an embodiment of a pump 50 of the pump trucks 14 including sensors 34 arranged at a suction side 52 and a discharge side 54. It should be appreciated that while the illustrated embodiment includes the sensors 34 proximate the pump 50, in other embodiments the sensors 34 may be arranged along any portion of either the suction of discharge sides 52, 54 of the pump. For instance, the sensors 34 may be arranged downstream of the blender unit 26 or at any other reasonable location on the suction side 52 of the pump 50. Furthermore, the sensors 34 may further be arranged at any reasonable location on the discharge side 54 of the pump, such as on the distribution system 30 (for example, at a common manifold), the discharge piping 32, or the like. Additionally, it should be appreciated that groups or banks of pumps may share sensors 34. That is, the sensors 34 may be arranged at a manifold directing fluid to a group of pumps and/or at an outlet that collects fluid from a group of pumps. Also, as illustrated, individual pumps 50 may have dedicated sensors 34. The illustrated pump 50 further includes the sensor 36. In embodiments, the sensor 36 measures vibration (which may be determined by acceleration, frequency, or the like) of the pump 50, which may be utilized to monitor for potential cavitation or other pump related issues. Furthermore, the sensor 36 may be arranged at any location on the suction or discharge sides 52, 54 of the pump to monitor other properties of the fracturing system, such as pressure, temperature, or the like.

The embodiment illustrated in FIG. 2 also includes a controller 56 having a memory 58 and a processor 60. It should be appreciated that the memory 58 may be any type of non-transitory machine readable medium, such as a solid state drive or magnetic hard drive, among other options. Moreover, the memory 58 may store one or more programs having executable instructions that, when executed by the processor 60, cause the processor run the programs. As illustrated, data from the sensors 34, 36 is communicatively transmitted to the controller 56, for example via a wired or wireless communication (e.g., Wi-Fi, cellular networks, universal serial bus, etc.). As will be described below, the controller 56 may be utilized to store and monitor data to detect inefficiencies in the pumping system 16, for example loss of efficiencies at the pump 50. This loss of efficiency may also be referred to as a damage threshold that indicates certain damage, which may lead to reduced pumping efficiencies. For example, the slurry may impinge on the pump impellers and cause pitting or misalignment. By way of example, in various embodiments, cavitation may damage the impeller or pump housing. This loss of efficiency may be indicative of a potential maintenance event that may be identified and scheduled before the pump becomes inoperable. Additionally, the controller 56 may monitor the flow rate into and out of the pump 50 to regulate and control pumping operations. For example, the controller 56 may detect a variance in the suction side 52 flow rate of one or more pumps 50 in the pumping system 16. Accordingly, adjustments may be initiated, such as throttling valves, pump maintenance, or the like, to improve the efficiency of the pumping operation. In certain embodiments, based on the data received from the sensors 34, 36, the controller 56 may transmit a signal to one or more pumps 50 to adjust operation of the pump 50, such as increasing a pump speed, adjusting discharge or suction pressures, or the like. In this manner, pumping operations may be monitored and controlled utilizing one or more of the sensors 34, 36.

In the illustrated embodiment, there are the sensors 34 arranged on each side of the pump That is, there are sensors 34 monitoring both the suction side 52 and the discharge side 54. This arrangement enables the controller 56 to monitor the efficiency of the pump, which may be calculated in a variety of methods but in certain embodiments is a ratio of the suction flow rate to the discharge flow rate. Where the suction flow rate is significantly higher than the discharge flow rate (e.g., by a threshold amount) there is an indication of efficiency losses across the pump 50. However, it should be appreciated that in other embodiments more of fewer sensors may be utilized. Moreover, in embodiments there may be sensors 34 on only the suction side 52 or only the discharge side 54.

Figure 3:
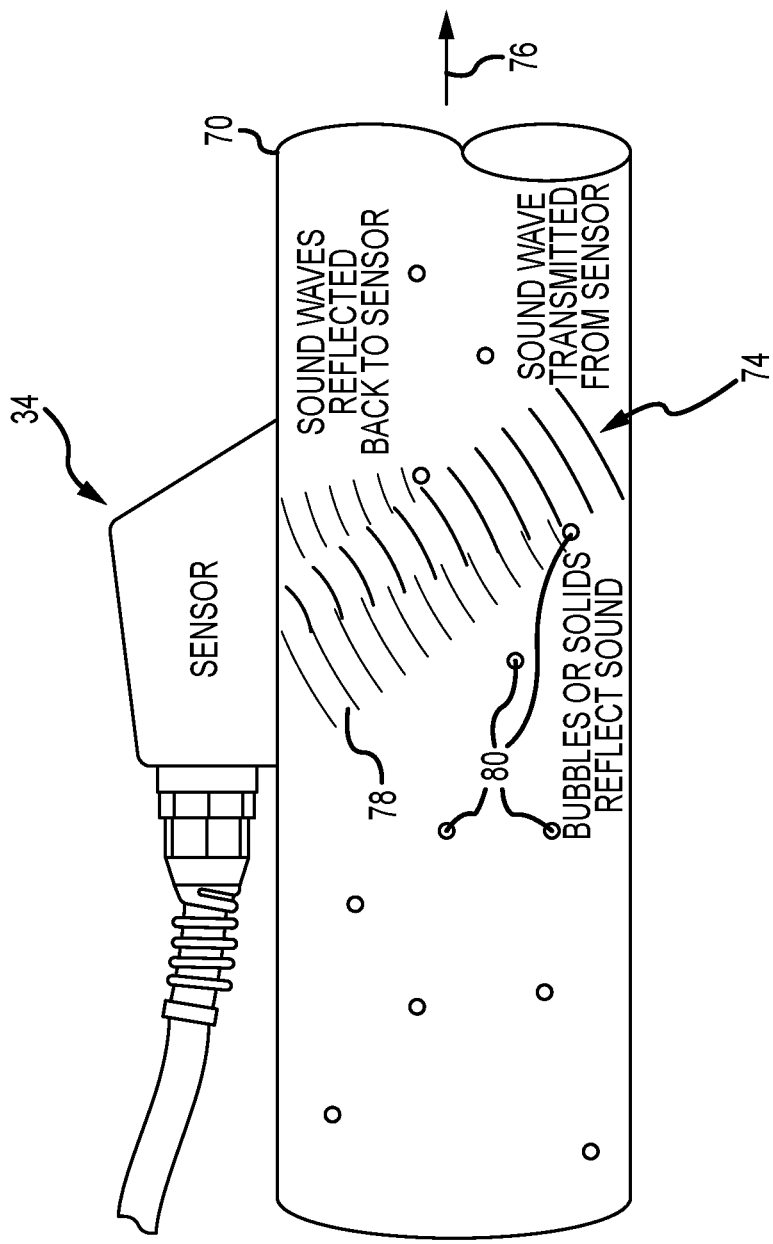
FIG. 3 is a side elevational schematic diagram of an embodiment of a sensor in the form of a Doppler effect sensor, in accordance with embodiments of the present disclosure.

FIG. 3 is a schematic of an embodiment of the sensor 34. In the illustrated embodiment, the sensor 34 is a Doppler flow meter (e.g., ultrasonic flow meter). In operation, the Doppler flow meter transmits sound waves through a tubular 70 (such as the piping on the suction or discharge sides 52, 54 of the pump 50). The sound waves reflect back to the sensor 34 as they contact the particles in the slurry, thereby providing an indication of the flow rate through the tubular. For example, the sensor 34 may include a transmitter that transmits a soundwave 74 signal into a flow path 76 and a receiver that receives and/or detects a frequency shifted return soundwave 78 (based on the reflection via interaction with particulates 80 in the flow). Advantageously, embodiments that utilize the illustrated Doppler flow meter are not in contact with the slurry solution, which may be abrasive and damage other sensor tools, such as rods, that are inserted directly into the flow. Accordingly, the longevity of the sensors may be improved. Additionally, the Doppler flow meters may be easier to install because access points will not be drilled into the tubular, for example to insert a probe, and flow meter spools may not be utilized either, which form leak points due to the inclusion of flanges.

It should be appreciated that while FIG. 3 illustrates the Doppler flow meter, in various other embodiment different flow meters may be utilized. These flow meters may be non-contact flow meters or may contact the slurry flow. Examples of other non-contact flow meters include electromagnetic flow meters, radar flow meters, mass flow meters (e.g., Coriolis flow meters), laser flow meters, and the like. Furthermore, in embodiments, contact flow meters may also be utilized. Examples of contact flow meters include turbine flow meters, variable area flow meters, paddle wheels flow meters, positive displacement flow meters, and the like. Accordingly, while in various embodiment thru-pipe sensing may be discussed and utilized, in other embodiments contact flow meters may also be used.

Figure 4:
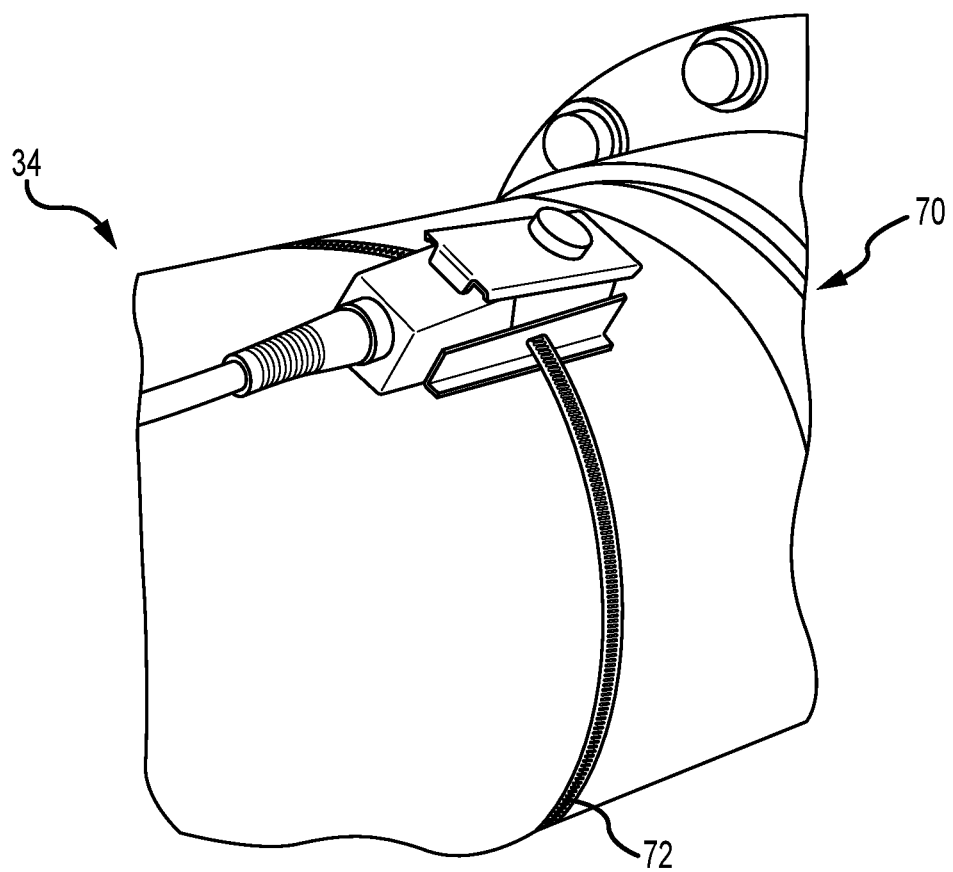
FIG. 4 is an isometric view of an embodiment of the sensor of FIG. 3, in accordance with embodiments of the present disclosure.

FIG. 4 is an isometric view of an embodiment of the sensor 34 arranged on the tubular 70. As described above, the tubular 70 may be any portion of the hydraulic fracturing system 10 arranged either upstream of downstream of the pumps 50 that transmits a fluid flow. In the illustrated embodiment, the sensor 34 is the Doppler flow meter that is secured to the tubular 70 via a strap 72. In other embodiments, different methods to secure the sensor 34 may be utilized, for example a compound or adhesive that facilitates the transmission of soundwaves into the tubular 70. Arranging the sensor 34 on the outside of the tubular 70, e.g., out of the flow stream, removes sensitive components from the abrasive slurry solution flow. Additionally, the sensor 34 may be easily removed for maintenance or moved to a different location.

Figure 5:
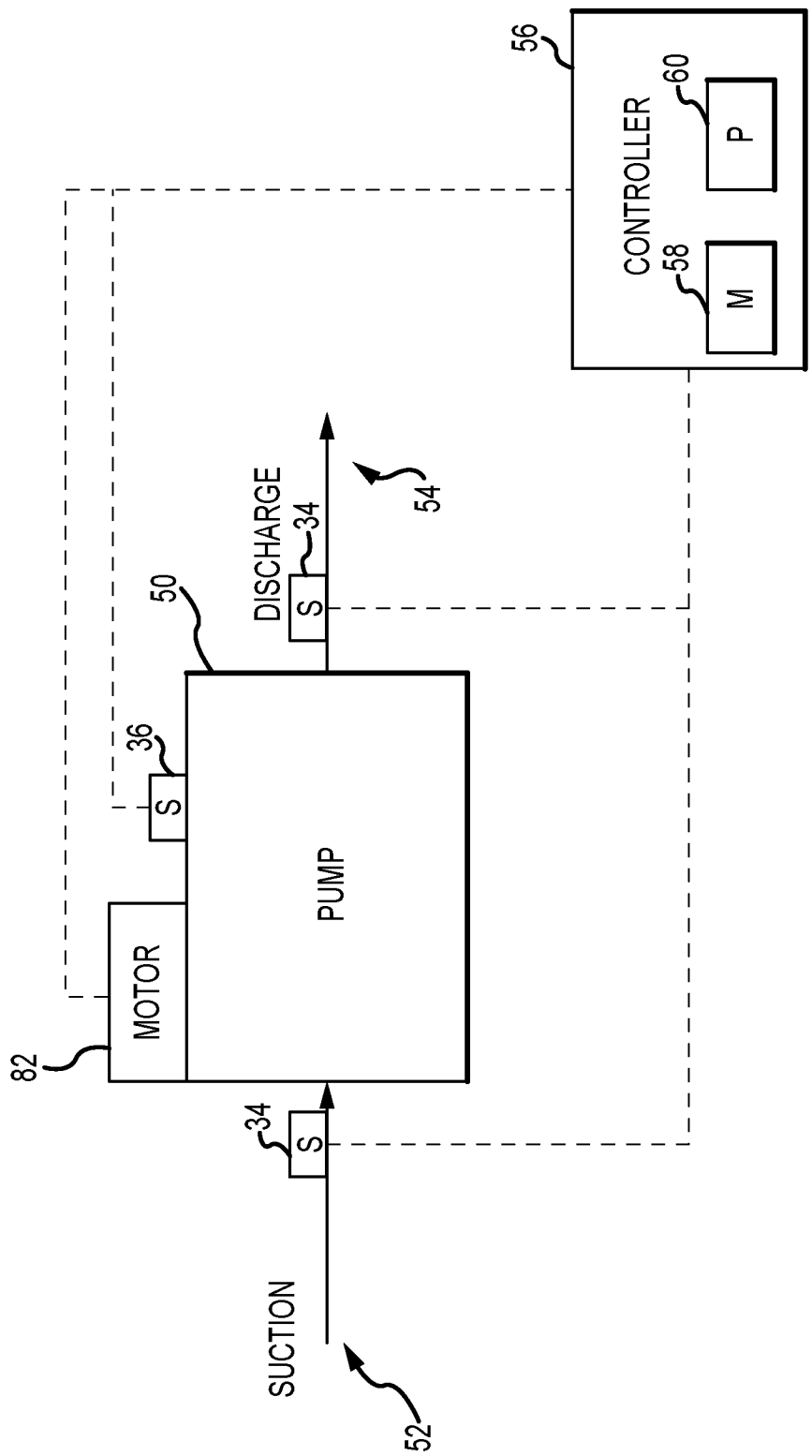
FIG. 5 is a schematic diagram of an embodiment of a pump and a controller, in accordance with embodiments of the present disclosure.

FIG. 5 is a schematic diagram of an embodiment of the pump 50 having a motor 82 communicatively coupled to the controller 56. As described above, data from the sensors 34, 36 is transmitted to the controller 56 for analysis. For example, the controller 56 may determine the difference between an outlet flow rate and an inlet flow rate is greater than a threshold and thereby initiates corrective measures, such as adjusting the speed of the pump 50 via the motor 80. In this manner, data acquisition from the sensors 34, 36 may be utilized to adjust operating parameters in real or near-real time (e.g., without significant delay). In certain embodiments, this process may be automated. In other embodiments, the controller 56 may include one or more displays to transmit operating parameters to an operator to manually adjust the pump 50. Furthermore, the controller 56 may monitor an efficiency of the pump 50 over time and predict when maintenance operations may be scheduled. For example, as efficiency decreases the controller 56 may determine that maintenance operations may be helpful in returning the pump 50 to a previous operating efficiency.

In certain embodiments, the controller 56 may be used to monitor the pumps against a damage threshold. In various embodiments, the damage threshold may correspond to a minimum operating condition for one or more operating parameters. For example, in certain embodiments, a speed of the pump may be used at the operating parameter. There may be a minimum pump speed that corresponds to the damage threshold. If the pump speed drops below the damage threshold, the controller 56 may transmit a signal, for example to an operator, indicative of the operating parameter being below the damage threshold. In various embodiments, the operating parameter being below the damage threshold may trigger a maintenance operator. However, in certain embodiments, remediation attempts may be triggered in order to increase the longevity of the pump and/or to determine whether one or more different parameters may be adjusted to overcome the damage threshold. For example, in the example of a decreased pump speed, the operator may increase a suction or discharge pressure of the pump, which may adjust the speed above the damage threshold. It should be appreciated that the adjustments may be tailored so as to not drop below a different damage threshold associated with a different operating parameter. For example, reducing the suction pressure below a suction pressure damage threshold would be undesirable. Accordingly, adjustments to operating parameters may be performed without triggering further adjustments due to changes related to respective damage thresholds. It should be appreciated that different sets of pumps may have different damage thresholds, which may be stored in a database, and in certain embodiments, may be determined based on prior use in the field and updated as additional operations are performed.

Figure 6:
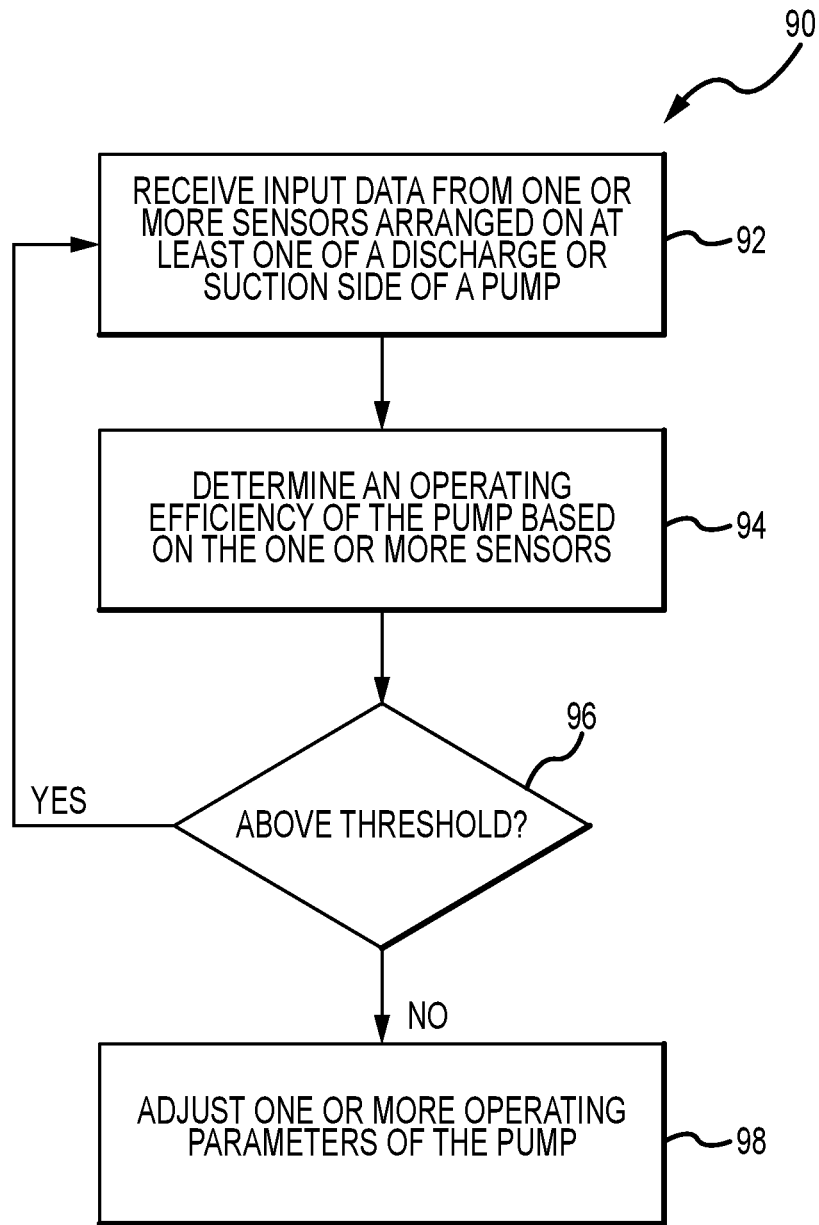
FIG. 6 is a flow chart of an embodiment of a method for monitoring a pump in a fracturing operation, in accordance with embodiments of the present disclosure.

FIG. 6 is a block diagram of an embodiment of a method 90 for adjusting one or more pump operating conditions. It should be appreciated that for this method, and any other method described herein, that the steps may be performed in a different order or in parallel, unless otherwise specifically indicated. Furthermore, more or fewer steps may be included within the method. The method 90 may be utilized to measure an inlet and outlet flow rate of the pump 50, compare the difference, evaluate the difference against a threshold, and undergo correcting steps when the difference is below the threshold. Input data from one or more sensors 34 arranged on at least one of the suction side 52 or the discharge side 54 of the pump 50 is received by the controller 56 (block 92). As described above, the sensors 34 may be at the inlet or outlet of the pump, or at other positions along the pumping system 16. Furthermore, multiple inputs (for example from other sensors 36) may be received to thereby also include features such as line loss or other flow properties into the calculation. Thereafter, the controller 56 determines an operating efficiency of the pump 50 based on the one or more sensors 34 (block 94). The efficiency may be calculated in a variety of ways, such as a difference between the input flow rate and the output flow rate, a ratio, or any other reasonable calculation. Then the efficiency calculation is evaluated against a threshold (operator 96). The threshold may be a predetermined value that indicates the pump 50 is not operating at a sufficient efficiency. For example, the efficiency may be determined based on previous operations or based on one or more properties of the pumps. If the calculated efficiency is below the threshold (e.g., the pump is operating below a desired or predetermined efficiency) then one or more adjustments may be made to the pump 50 (block 98). For example, the motor speed may be adjusted, inlet or outlet pressures may be adjusted, a flow rate toward the pump 50 may be adjusted, or the like. If the calculated efficiency is above the threshold (e.g., the pump is operating above a desired or predetermined efficiency) then the controller 56 continues to monitor input data from the sensors 34. In this manner, continuous monitoring of the pumping system 16 may be utilized. It should be appreciated that while the method 90 is described with reference to a pump, in other embodiments multiple pumps within the pumping system 16 may be monitored and evaluated. For instance, the sensors 34 may be arranged at the inlet and/or outlet of a pump group comprising more than one pump. Accordingly, the efficiency over the group of pumps may be monitored. Or, in embodiments, each pump in the group may be monitored individually. In this manner, operating parameters of the pumps 50 may be continuously monitored to improve efficiencies at the well site.

Figure 7:
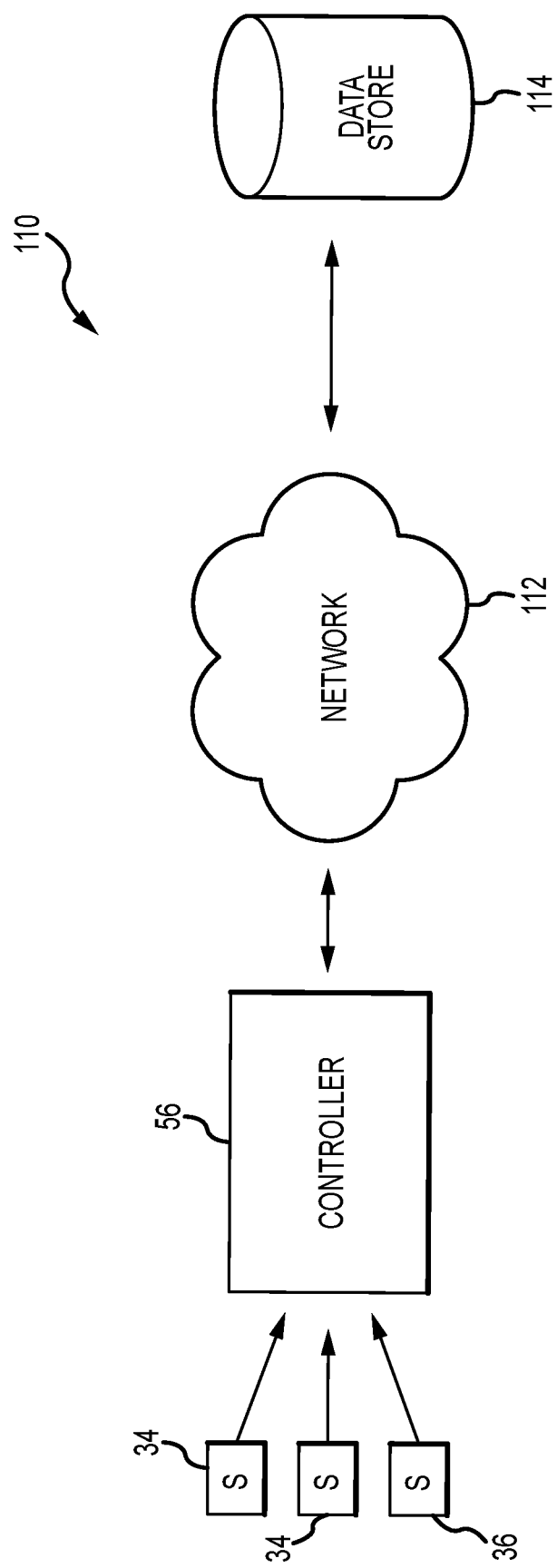
FIG. 7 is a block diagram of an embodiment of a control system, in accordance with embodiments of the present disclosure.

FIG. 7 is a block diagram of an embodiment of a control system 110 for receiving, analyzing, and storing information from the well site 12. As described above, the sensors 34, 36 arranged at the well site 12 may transmit data to the controller 56 for evaluation and potential adjustments to operating parameters of equipment at the well site 12. The controller 56 may be communicatively coupled to a network 112, such as the Internet, that can access a data store 114, such as a cloud storage server. Accordingly, in embodiments, data from the sensors 34, 36 is transmitted to the controller 56 (which may be located within the data van 38) and is stored locally. However, the controller 56 may upload the data from the sensors 34, 36, along with other data, to the data store 114 via the network 112. Accordingly, data from previous pumping operations or different sensors may be utilized to adjust the flow system as needed. For example, the flow data from the sensor 34 may be coupled with information from the sensors 36 (such as the vibration sensor, gear sensors, RPM sensors, pressure sensors, etc.) to provide diagnostics with information from the data store 114. In embodiments, the data store 114 includes information of the equipment used at the well site 12, such as the pumps. The information may include data related to the pumps such as the last time since the pump was serviced or additional information. This data may be combined with the data acquired from the sensors 34, 36 and the efficiency calculations to identify pumps that are candidates for maintenance. For example, a first pump may have a reduced efficiency and also be close to a scheduled maintenance period. Accordingly, the controller 56 may determine the efficiency is below a desired amount and also pull information from the data store 114 indicating maintenance may be needed. Accordingly, the controller 56 may transmit the information to one or more operators that may take the pump offline. If the first pump is part of a pump group then the other sensors 34 may be utilized to monitor the other pumps in the group after removal of the first pump to adjust flow rates to optimize their operation. In this manner, operations at the well site 12 may continue without significant interruption because the first pump can be identified and pulled from service before a failure that may disrupt operations. It should be appreciated that, in various embodiments, information from the data store 114 may be stored in local storage, for example in storage within the data can 38, and as a result, communication over the network 112 to the remote data store 114 may not be used. For example, in various embodiments, drilling operations may be conducted at remote locations where Internet data transmission may be slow or unreliable. As a result, information from the data store 114 may be downloaded and stored locally at the data van 38 before the operation, thereby providing access to the information for evaluation of operation conditions at the well site 12.

Figure 8:
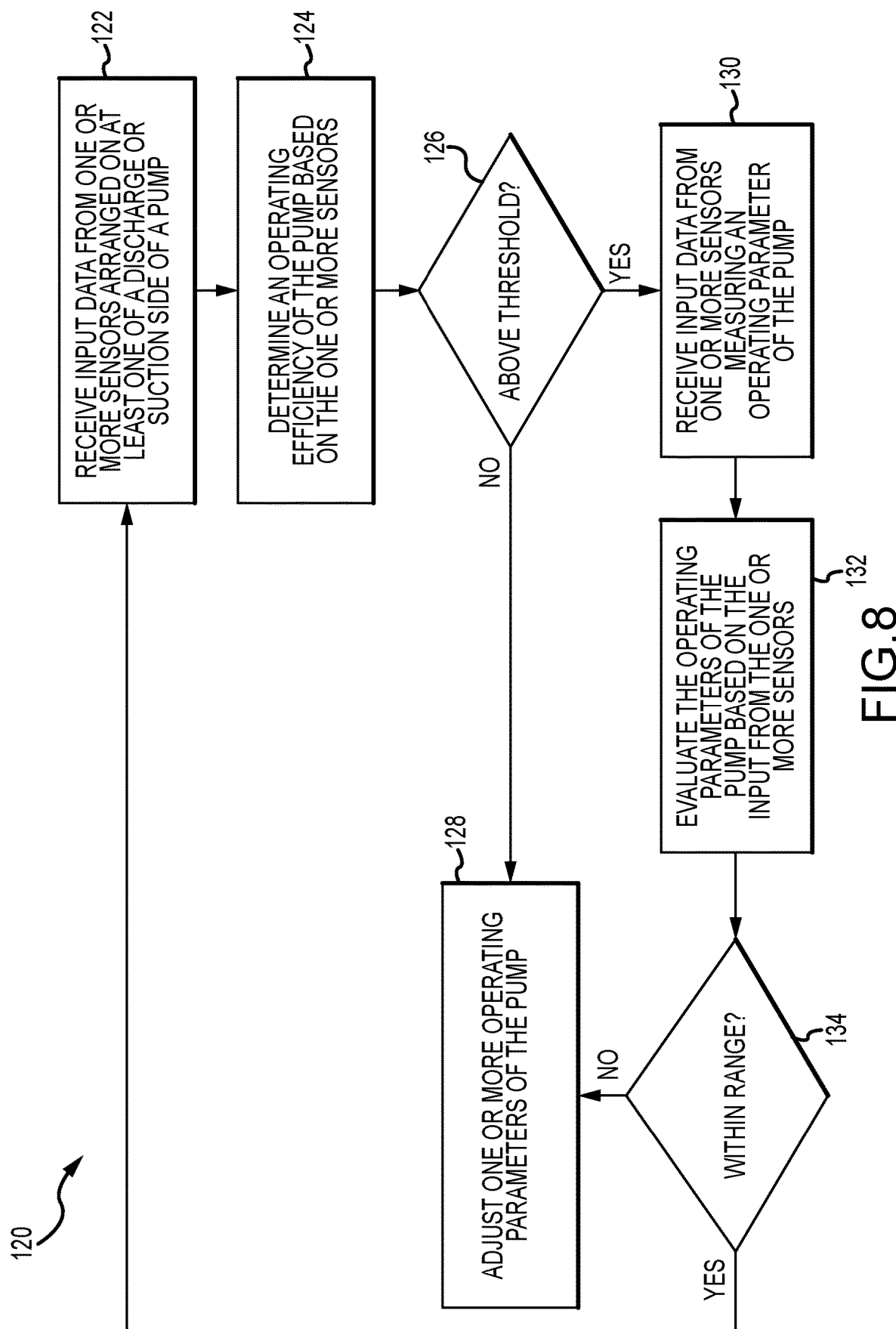
FIG. 8 is a flow chart of an embodiment of a method for monitoring a pump in a fracturing operation, in accordance with embodiments of the present disclosure.

FIG. 8 is a flow chart of an embodiment of a method 120 for monitoring operating conditions of one or more pumps 50. The method 120 may be utilized to measure an inlet and outlet flow rate of the pump 50, compare the difference, evaluate the difference against threshold, evaluate other operating parameters of the pump 50, and undergo correcting steps when the efficiency or operating parameters are outside of a desired operating range. Input data from one or more sensors 34 arranged on at least one of the suction side 52 or the discharge side 54 of the pump 50 is received by the controller 56 (block 122). As described above, the sensors 34 may be at the inlet or outlet of the pump, or at other positions along the pumping system 16. Furthermore, multiple inputs may be received to thereby also include features such as line loss or other flow properties into the calculation. Thereafter, the controller 56 determines an operating efficiency of the pump 50 based on the one or more sensors 34 (block 124). The efficiency may be calculated in a variety of ways, such as a difference between the input flow rate and the output flow rate and the like as described above. Then the efficiency is evaluated against a threshold (operator 126). The threshold may be a predetermined value that indicates the pump 50 is not operating at a sufficient or desired efficiency. As described above, in various embodiments, a desired efficiency may be predetermined, for example, based on operating conditions at the well site and/or previous operating conditions. If the efficiency is below the threshold (e.g., the pump is operating below a desired or predetermined efficiency) then one or more adjustments may be made to the pump 50 (block 128). For example, the motor speed may be adjusted or a flow rate toward the pump 50 may be adjusted. If the calculated efficiency is above the threshold (e.g., the pump is operating above a desired or predetermined efficiency) then the controller 56 receives input from one or more sensors 36 that measure one or more operating parameters of the pump (block 130). For example, the sensors 36 may measure the vibration, RPM, pressures, or the like. The data is compared against a range for the respective operating parameters (132). This range may be predetermined based on desired operating conditions of the pump. Additionally, the range may be acquired from the data store 114 based on previous operating conditions of the pump. If the operating conditions are within the range, then the method 120 returns to monitoring the flow rates. If the operating conditions are outside of the range, then one or more adjustments may be made to the pump 50 (block 128), as described above. In this manner, flow rates determined by the sensor 34 may be coupled with other information from the sensors 36 to effectively manage flow rates and operating conditions at the well site 12.

FIG. 9 is a flow chart of an embodiment of a method 140 for monitoring operating conditions of one or more pumps 50. In various embodiments, the method 140 may include monitoring one or more operating parameters of the pump, comparing the operating parameters against a damage threshold, adjusting one or more parameters of the pump when the damage threshold is exceeded, determining whether the adjustments cause one or more different operating parameters to exceed a damage threshold, and transmitting a signal indicative of the operating parameters of the pump and/or instructions for further use of the pump. In this example, input data indicative of a flow rate is received (block 142). For example, the flow rate at a pump inlet or a pump outlet may be received for evaluation. In various embodiments, as described above, the flow rate may be indicative of one or more operating conditions of the pump, such as a normal or desired operating condition or a maintenance required operating condition. In the illustrated embodiment, the flow rate is compared against a damage threshold (operator 144). The damage threshold may be a pre-determined value indicative of an expected operating condition of the pump. In various embodiments, the damage threshold may be indicative of pump damage (e.g., cavitation, alignment, etc.) and may be based, at least in part, on data from previous pumping operations. If the flow rate is below the damage threshold, the method returns to the receiving input data, thereby enabling continuous monitoring. If the flow rate is above the damage threshold, then one or more parameters are adjusted (block 146). Additional sensors may provide input data indicative of the one or more parameters that were adjusted (block 148). For example, if an inlet pressure was adjusted then a pressure transducer may provide information indicative of an outlet pressure after the adjustment. In other words, different operating parameters associated with the pump may be evaluated after the adjustment to determine whether the adjustment has caused any of the additional operating parameters to exceed a second damage threshold (operator 150). If not, then the method returns to operator 144 to determine whether the flow rate exceeds the damage threshold. If so, then additional parameters that may be adjusted are evaluated (operator 152). If there are additional operating parameters to adjust, then the method returns to adjust those parameters. If not, then the pump is flagged (block 154), which may be an indication that the pump may be scheduled for maintenance or taken offline. Accordingly, various operating parameters may be adjusted and compared against damage thresholds to monitor a health and operational functionality of one or more pumps.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for monitoring an electric-powered hydraulic fracturing pump, comprising:
    a first sensor providing a suction side flow rate for the electric-powered hydraulic fracturing pump;
    a second sensor providing a discharge side flow rate for the electric-powered hydraulic fracturing pump;
    a third sensor providing one or more operating parameters for the electric-powered hydraulic fracturing pump; and
    a controller communicatively coupled to the electric-powered hydraulic fracturing pump, the first sensor, the second sensor, and the third sensor, the controller including at least one processing unit and at least one memory, the at least one memory including stored software instructions that, when executed by the at least one processing unit, cause the controller to:
        determine an efficiency of the electric-powered hydraulic fracturing pump based, at least in part, on the suction side flow rate and the discharge side flow rate;

determine the efficiency is below a target pump efficiency;

adjust the one or more operating parameters for the electric-powered hydraulic fracturing pump;

determine an updated suction side flow rate, after adjusting the one or more operating parameters;

determine an updated discharge side flow rate, after adjusting the one or more operating parameters;

determine an updated efficiency, based at least in part, on the updated suction side flow rate and the updated discharge side flow rate;

determine the updated efficiency exceeds the target pump efficiency; and store the operating parameters of the electric-powered hydraulic fracturing pump after adjusting the one or more operating parameters.

2. The system of claim 1, wherein the stored software instructions, when executed by the at least one processing unit, further cause the controller to:

determine a second updated suction side flow rate, after adjusting the one or more operating parameters;

determine a second updated discharge side flow rate, after adjusting the one or more operating parameters;

determine a second updated efficiency, based at least in part, on the second updated suction side flow rate and the second updated discharge side flow rate;

determine the second updated efficiency is below the target pump efficiency; and provide an alert to an operator.

3. The system of claim 1, wherein at least one of the suction side flow rate or the discharge side flow rate is determined using a magnetic flow meter.

4. The system of claim 1, wherein the one or more operating parameters include a pump speed, a suction pressure, a discharge pressure, a vibration level, or a combination thereof.

5. A system for monitoring an electric-powered hydraulic fracturing pump, comprising:

a first sensor providing a suction side flow rate for the electric-powered hydraulic fracturing pump;

a second sensor providing a discharge side flow rate for the electric-powered hydraulic fracturing pump;

a third sensor providing one or more operating parameters for the electric-powered hydraulic fracturing pump; and a controller communicatively coupled to the electric-powered hydraulic fracturing pump, the first sensor, the second sensor, and the third sensor, the controller including at least one processing unit and at least one memory, the at least one memory including stored software instructions that, when executed by the at least one processing unit, cause the controller to:

determine a first operating condition of the electric-powered hydraulic fracturing pump based, at least in part, on the suction side flow rate and the discharge side flow rate;

determine the first operating condition exceeds a first damage threshold for the electric-powered hydraulic fracturing pump;

adjust, after determining the first operating condition exceeds the damage threshold, a first selected pump setting from a set of adjustable pump settings;

determine a second operating condition of the electric-powered hydraulic fracturing pump based, at least in part, on the one or more operating parameters;

determine the second operating condition exceeds a second damage threshold;

select, from the set of adjustable pump settings, a second selected pump setting;

adjust, after determining the second operating condition exceeds the second damage threshold, the second selected pump setting;

determine a third operating condition of the electric-powered hydraulic fracturing pump based, at least in part, on the one or more operating parameters after adjusting the second selected pump setting is below the second damage threshold; and cause the electric-powered hydraulic fracturing pump to operate using the second selected pump setting.

6. The system of claim 5, wherein the stored software instructions, when executed by the at least one processing unit, further cause the controller to:

select, from the set of adjustable pump settings, a third selected pump setting;

adjust, after determining the second operating condition exceeds the second damage threshold, the third selected pump setting;

determine a fourth operating condition of the electric-powered hydraulic fracturing pump based, at least in part, on the one or more operating parameters after adjusting the third selected pump setting, exceeds second damage threshold;

determine there are no additional adjustable pump settings; and generate an alert for the electric-powered hydraulic fracturing pump.

7. The system of claim 5, wherein at least one of the suction side flow rate or the discharge side flow rate is determined using a magnetic flow meter.

8. The system of claim 5, wherein the set of adjustable pump settings includes a pump speed, a suction pressure, a discharge pressure, a vibration level, or a combination thereof.

9. A system for monitoring an electric-powered hydraulic fracturing pump, comprising:

a first sensor providing a suction side flow rate for the electric-powered hydraulic fracturing pump;

a second sensor providing a discharge side flow rate for the electric-powered hydraulic fracturing pump;

a third sensor providing one or more operating parameters for the electric-powered hydraulic fracturing pump; and a controller communicatively coupled to the electric-powered hydraulic fracturing pump, the first sensor, the second sensor, and the third sensor, the controller including at least one processing unit and at least one memory, the at least one memory including stored software instructions that, when executed by the at least one processing unit, cause the controller to:

determine an efficiency of the electric-powered hydraulic fracturing pump based, at least in part, on the suction side flow rate and the discharge side flow rate;

determine the efficiency is below a target pump efficiency;

adjust the one or more operating parameters for the electric-powered hydraulic fracturing pump;

determine an updated suction side flow rate, after adjusting the one or more operating parameters;

determine an updated discharge side flow rate, after adjusting the one or more operating parameters;

determine an updated efficiency, based at least in part, on the updated suction side flow rate and the updated discharge side flow rate;

determine the updated efficiency is below the target pump efficiency; and provide an alert to an operator.

10. The system of claim 9, wherein the stored software instructions, when executed by the at least one processing unit, further cause the controller to:

determine a second updated suction side flow rate, after adjusting the one or more operating parameters;

determine a second updated discharge side flow rate, after adjusting the one or more operating parameters;

determine a second updated efficiency, based at least in part, on the second updated suction side flow rate and the second updated discharge side flow rate;

determine the second updated efficiency exceeds the target pump efficiency; and store the operating parameters of the electric-powered hydraulic fracturing pump after adjusting the one or more operating parameters.

11. The system of claim 9, wherein at least one of the suction side flow rate or the discharge side flow rate is determined using a magnetic flow meter.

12. The system of claim 9, wherein the one or more operating parameters include a pump speed, a suction pressure, a discharge pressure, a vibration level, or a combination thereof.

* * * * *